(12) United States Patent
Bresser

(10) Patent No.: US 9,193,341 B2
(45) Date of Patent: Nov. 24, 2015

(54) SLIP-CONTROLLED HYDRAULIC VEHICLE BRAKE SYSTEM

(71) Applicant: Robert Bosch GmbH, Stuttgart (DE)

(72) Inventor: Andreas Bresser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/107,454

(22) Filed: Dec. 16, 2013

(65) Prior Publication Data

US 2014/0167496 A1 Jun. 19, 2014

(30) Foreign Application Priority Data

Dec. 17, 2012 (DE) .......................... 10 2012 223 325

(51) Int. Cl.
*B60T 8/40* (2006.01)
*B60T 8/48* (2006.01)
*B60T 17/02* (2006.01)

(52) U.S. Cl.
CPC ................. *B60T 8/4872* (2013.01); *B60T 8/40* (2013.01); *B60T 17/02* (2013.01)

(58) Field of Classification Search
CPC ......... B60T 8/40; B60T 8/341; B60T 8/4013; B60T 8/4872; B60T 17/02
See application file for complete search history.

(56) References Cited

U.S. PATENT DOCUMENTS

| | | | | |
|---|---|---|---|---|
| 6,079,796 | A | * | 6/2000 | Schmidt et al. ............ 303/113.2 |
| 2011/0108375 | A1 | * | 5/2011 | Wuerth et al. ............ 188/106 P |
| 2011/0175435 | A1 | * | 7/2011 | Wuerth et al. .................... 303/3 |
| 2012/0074771 | A1 | * | 3/2012 | Vollert et al. .............. 303/114.1 |

FOREIGN PATENT DOCUMENTS

| | | |
|---|---|---|
| DE | 195 01 760 A1 | 7/1996 |
| DE | 10 2010 043 403 A1 | 5/2012 |

* cited by examiner

*Primary Examiner* — Vishal Sahni
(74) *Attorney, Agent, or Firm* — Maginot, Moore & Beck LLP

(57) ABSTRACT

A slip-controlled hydraulic vehicle brake system includes a first hydraulic pump configured to draw brake fluid out of wheel brakes or out of a hydraulic accumulator connected to the wheel brakes. The brake system also includes two further hydraulic pumps configured to be connected to a brake master cylinder for a rapid pressure buildup. To pump against a high brake pressure while the vehicle brake system is actuated, only the first hydraulic pump is used, while the other two hydraulic pumps are separated from the brake master cylinder and run "at idle" at the same time. The necessary mechanical driving power of the hydraulic pumps is thereby reduced, and a very rapid pressure buildup is nevertheless possible.

17 Claims, 2 Drawing Sheets

SLIP-CONTROLLED HYDRAULIC VEHICLE BRAKE SYSTEM

This application claims priority under 35 U.S.C. §119 to patent application no. DE 10 2012 223 325.3, filed on Dec. 17, 2012 in Germany, the disclosure of which is incorporated herein by reference in its entirety.

BACKGROUND

The disclosure relates to a slip-controlled hydraulic vehicle brake system having the features described below.

German Offenlegungsschrift DE 195 01 760 A1 discloses a slip-controlled hydraulic vehicle brake system, the brake circuits of which are connected via isolation valves to a brake master cylinder. It has wheel brakes, which are connected via pressure buildup valves to the isolation valves and via pressure lowering valves to a suction side of a hydraulic pump. For wheel-specific brake pressure control, each wheel brake has a pressure buildup valve and a pressure lowering valve. A hydraulic pump is provided in each brake circuit, wherein the hydraulic pumps of the brake circuits are driven jointly by an electric motor as a drive or pump motor. Hydraulic pumps in slip-controlled vehicle brake systems are also referred to as return pumps. For a rapid brake pressure buildup when the brake master cylinder is not actuated and the vehicle brake system is unpressurized, the known vehicle brake system has an intake valve, by means of which a suction side of the hydraulic pump can be connected to the brake master cylinder. The pressure buildup valves and pressure lowering valves can be regarded as wheel brake pressure modulation valve arrangements, by means of which wheel brake pressures can be controlled in each vehicle wheel on a wheel-specific basis. In this way, antilock control, traction control and vehicle dynamics/antiskid control operations are possible, for which abbreviations such as ABS, ASR, ESP and FDR are customary. These slip control operations are known per se and will not be explained in greater detail here.

In German Offenlegungsschrift DE 10 2010 043 403 A1, the hydraulic pump in one brake circuit is replaced by three hydraulic pumps or hydraulic pump elements connected hydraulically in parallel, which are driven jointly.

For the hydraulic pumps of such vehicle brake systems, there are two requirements, which are diametrically opposed: on the one hand, they must be capable of pumping brake fluid against a brake pressure prevailing in the vehicle brake system when the brake master cylinder is actuated. In this case, the prevailing pressure is very high when the brake master cylinder is actuated with maximum muscle power by a vehicle driver. The hydraulic pump and the drive motor must not come to a halt. The opposite case is a brake pressure buildup when the brake master cylinder is not actuated and the vehicle brake system is unpressurized, which requires a large delivery volume flow from the hydraulic pump to achieve a rapid pressure buildup. Achieving a high or even the maximum pressure is not decisive here, a moderate or medium pressure being sufficient. The rapidity of the pressure buildup and, associated with this, the rapidity of actuation of one or more wheel brakes is crucial in a vehicle dynamics/antiskid control operation because a tendency for a vehicle to skid can only be counteracted effectively by a very rapid braking intervention at one or more vehicle wheels: the more rapid the braking intervention, the more effectively a tendency to skid can be counteracted. The two requirements lead to a hydraulic pump which is per se overdimensioned and to a drive motor which is per se overdimensioned. A relatively large and heavy drive motor with a high electric power consumption, which does not come to a halt, even at the maximum brake pressure in the vehicle brake system, but drives the hydraulic pump, is required.

SUMMARY

The vehicle brake system according to the disclosure having the features described below provides a slip-controlled hydraulic vehicle brake system having at least two hydraulic pumps in a brake circuit, which are preferably driven jointly by means of a drive motor. In contrast to the prior art, the hydraulic pumps of the vehicle brake system according to the disclosure are not connected hydraulically in parallel but a suction side of one of the hydraulic pumps is connected via a pressure lowering valve to a wheel brake, and a suction side of a further hydraulic pump is connected via an intake valve to the brake master cylinder. The brake master cylinder can be actuated by muscle power or auxiliary power, having a vacuum brake booster, for example. The hydraulic pumps of the vehicle brake system according to the disclosure can also be regarded as pump elements of one hydraulic pump.

In order to pump brake fluid out of one or more wheel brakes or out of a hydraulic accumulator against a high brake pressure in the vehicle brake system produced by actuation of the brake master cylinder during an antilock braking operation, the intake valve is or remains closed, thus ensuring that the further hydraulic pump does not deliver any brake fluid, as a result of which the driving torque thereof is negligible. For delivery, essentially only the first hydraulic pump need be driven, and this results in a corresponding reduction in a required driving power. It may also be necessary to pump brake fluid against a brake pressure produced by actuation of the brake master cylinder during vehicle dynamics/antiskid control operations, but for traction control it is not actually necessary.

If, on the other hand, a rapid pressure buildup is required for a vehicle dynamics/antiskid control operation when the brake master cylinder is not actuated and the vehicle brake system is unpressurized, the intake valve is opened, with the result that the further hydraulic pump draws brake fluid out of the brake master cylinder. To accelerate the pressure buildup, a further hydraulic pump, referred to here as a third hydraulic pump, is preferably provided, this being connected hydraulically in parallel with the further hydraulic pump and thus likewise drawing brake fluid out of the brake master cylinder. The first hydraulic pump can additionally draw brake fluid out of a hydraulic accumulator arranged on the suction side thereof if there is brake fluid in the hydraulic accumulator. It is also possible to open, at least briefly, a pressure lowering valve of a wheel brake, the associated vehicle wheel of which is not braked for the vehicle dynamics/antiskid control operation. In these two cases, the first hydraulic pump additionally pumps brake fluid out of the hydraulic accumulator and/or a wheel brake to the further hydraulic pump or further hydraulic pumps which are pumping brake fluid out of the brake master cylinder. A rapid brake pressure buildup for a vehicle dynamics/antiskid control operation and also for a traction control operation is possible, especially if delivery is performed not just with one hydraulic pump but with two or more hydraulic pumps, making possible the embodiments of the disclosure which are explained. As stated, the hydraulic pumps can also be regarded as pump elements of a hydraulic pump. One advantage of the disclosure is a lower maximum driving power requirement of the hydraulic pumps, permitting a smaller and lighter drive motor with a lower electric power consumption.

The below description relates to advantageous embodiments and developments of the disclosure.

BRIEF DESCRIPTION OF THE DRAWINGS

The disclosure is explained below by means of embodiments illustrated in the drawing.

DETAILED DESCRIPTION

Figure 1:
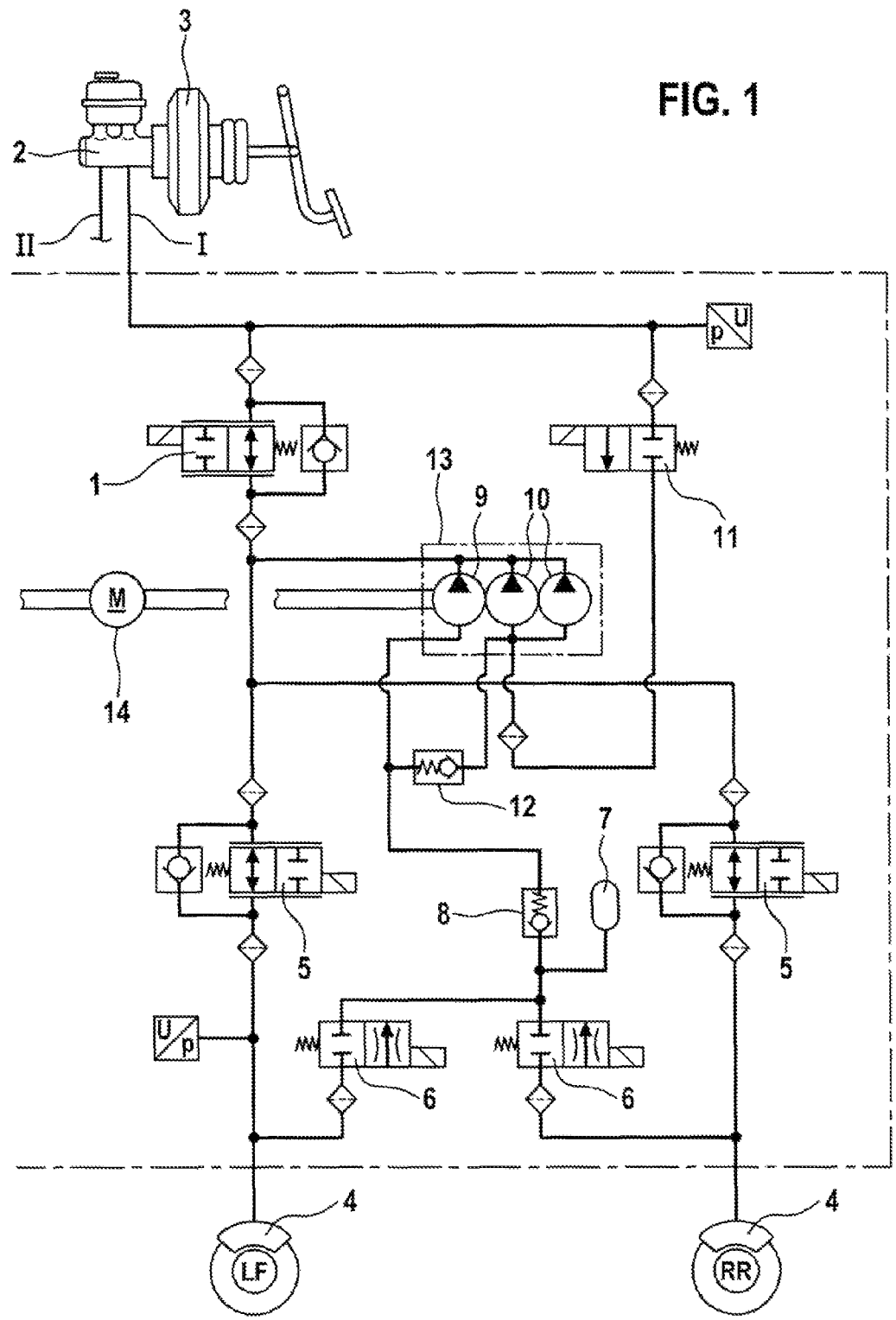
FIG. 1 shows a hydraulic circuit diagram of one embodiment of a slip-controlled vehicle brake system according to the disclosure.

The slip-controlled hydraulic vehicle brake system according to the disclosure shown in FIG. 1 has two identical brake circuits I, II, of which only one brake circuit I is shown in the drawing. Each brake circuit I, II is connected to a power-assisted tandem or dual circuit brake master cylinder 2 having a vacuum brake booster 3 via an isolation valve 1. Two wheel brakes 4 are connected hydraulically in parallel, via pressure buildup valves 5, to the isolation valve 1. The brake circuits I, II can also have just one or more than two wheel brakes 4, and the two brake circuits I, II can also have a different number of wheel brakes 4. Via respective pressure lowering valves 6, the wheel brakes 4 are connected jointly to a hydraulic accumulator 7 and, via a check valve 8, are connected to a suction side of a hydraulic pump 9. The check valve 8 allows flow from the pressure lowering valves 6 to the pump element 10. For wheel-specific brake pressure control, each wheel brake has a pressure buildup valve 5 and a pressure lowering valve 6. The pressure buildup valves 5 and pressure lowering valves 6 can also be regarded as wheel brake pressure modulation valve arrangements, by means of which wheel-specific brake pressure control for wheel slip control is possible. Such slip control operations are antilock control operations (ABS), traction control operations (ASR) and/or vehicle dynamics/antiskid control operations (ESP, FDR), which are known per se and will not be explained in greater detail here.

The vehicle brake system has two further hydraulic pumps 10, the suction sides of which are connected to one another and which are connected hydraulically in parallel with one another. One of the two further hydraulic pumps 10 can also be referred to as a third hydraulic pump 10. As stated, the suction sides of the two further hydraulic pumps 10 are connected to one another and are connected via an intake valve 11 to the brake master cylinder 2. Moreover, the two further hydraulic pumps 10 have a check valve 12 between the interconnected suction sides thereof and the check valve 8 connected to the pressure lowering valves 6. The check valve 12 on the suction sides of the two further hydraulic pumps 10 allows flow from the hydraulic pumps 10 in the direction of the check valve 8 connected to the pressure lowering valves 6 and in the direction of the suction side of the first hydraulic pump 9. Check valve 12 separates the two further hydraulic pumps 10 from the pressure lowering valves 6 and the hydraulic accumulator 7, and the two further hydraulic pumps 10 are separated hydraulically from hydraulic pump 9, likewise on their suction sides.

The pressure sides of all three hydraulic pumps 9, 10 are connected to one another and are connected between the isolation valve 1 and the pressure buildup valves 5 of the wheel brakes 4 to the brake circuit I, II. The hydraulic pumps 9, 10 can also be regarded as pump elements of a hydraulic pump 13 and are driven jointly by an electric motor as a pump or drive motor 14. The drive motor 14 drives the hydraulic pumps 9, 10 of both brake circuits I, II. The embodiments of the disclosure which have been described have a multi-piston pump comprising six pistons, i.e. six pump elements, which are referred to here as hydraulic pumps 9, 10. Three pump elements or hydraulic pumps 9, 10 are assigned to each brake circuit I, II. A piston pump is not essential for the disclosure: other hydraulic pumps are also possible instead of the hydraulic pump 9 or pump elements 10 (not shown).

The isolation valve 1 and the pressure buildup valves 5 are embodied as 2/2-way proportional solenoid valves which are open in their deenergized normal position, and the intake valve 11 and the pressure lowering valves 6 are embodied as 2/2-way way solenoid valves which are closed in their deenergized normal position. The pressure buildup valves 5 and pressure lowering valves 6 can be replaced by 3/3-way solenoid valves (not shown).

Actuation of the vehicle brake system is performed in a conventional manner by power assisted actuation of the brake master cylinder 2. For slip control, the hydraulic pumps 9, 10 are driven, and wheel brake pressures in the wheel brakes 4 are controlled by means of the pressure buildup valves 5 and the pressure lowering valves 6. Brake fluid flowing out of the wheel brakes 4 when the pressure in the wheel brakes 4 is lowered by opening the pressure lowering valves 6 is stored temporarily in the hydraulic accumulator 7 and is pumped back to the pressure buildup valves 5 and to the isolation valve 1 by means of the first hydraulic pump 9. The isolation valve 1 and the intake valve 11 can be opened and closed for slip control. If the intake valve 11 is closed, the two further hydraulic pumps 10, the suction sides of which are connected jointly to the intake valve 11, do not deliver any brake fluid but, as it were, run "at idle" together with the first hydraulic pump 9, in which case their mechanical driving power is negligible. When the intake valve 11 is closed, only the first hydraulic pump 9 delivers, the suction side of which is connected via check valve 8 to the hydraulic accumulator 7 and the pressure lowering valves 6. This makes it possible, with a relatively low mechanical driving power, to pump brake fluid even against a high brake pressure prevailing in the vehicle brake system when the brake master cylinder 2 is being actuated with maximum muscle power by a vehicle driver, boosted by the brake booster 3. The vehicle brake system therefore makes possible the use of a smaller, lighter and less powerful electric motor as a drive motor 14 for the hydraulic pumps 9, 10 of the two brake circuits I, II than a vehicle brake system with just one hydraulic pump for each brake circuit I, II or with pump elements delivering in parallel.

The disclosure makes possible a rapid pressure buildup, especially for a vehicle dynamics/antiskid control operation, with the brake master cylinder 2 unactuated and, as a result, with the vehicle brake system unpressurized, by opening the intake valve 11 and driving the hydraulic pumps 9, 10. The two further hydraulic pumps 10, the suction sides of which are connected jointly to the intake valve 11, draw in brake fluid from the brake master cylinder 2. By this means, a rapid pressure buildup of the kind necessary for vehicle dynamics/antiskid control operations is already possible. In addition, the first hydraulic pump 9 also draws in brake fluid from the brake master cylinder 2 through the open intake valve 11 and check valve 12, which is arranged between the suction sides of the two further hydraulic pumps 10 and the suction side of the first hydraulic pump 9 and allows flow in the direction of the first hydraulic pump 9. Thus, all three hydraulic pumps 9, 10 deliver brake fluid, resulting in a rapid pressure buildup. If there is brake fluid in the hydraulic accumulator 7 and/or at least one pressure lowering valve 6 is opened, the first hydraulic pump 9 additionally draws in brake fluid from the hydraulic accumulator 7 and/or from one of the wheel brakes 4, further accelerating the pressure buildup. Because normally only one wheel brake 4 in a brake circuit I, II is actuated for a vehicle dynamics/antiskid control operation and also for a traction control operation, the pressure lowering valve 6 of the other wheel brake 4 can be opened at least briefly for a rapid brake pressure buildup. The vehicle brake system according to the disclosure thus allows a very rapid brake pressure buildup by means of the hydraulic pumps 9, 10 when the brake master cylinder 2 is not actuated, and accordingly exhibits highly dynamic behavior.

Figure 2:
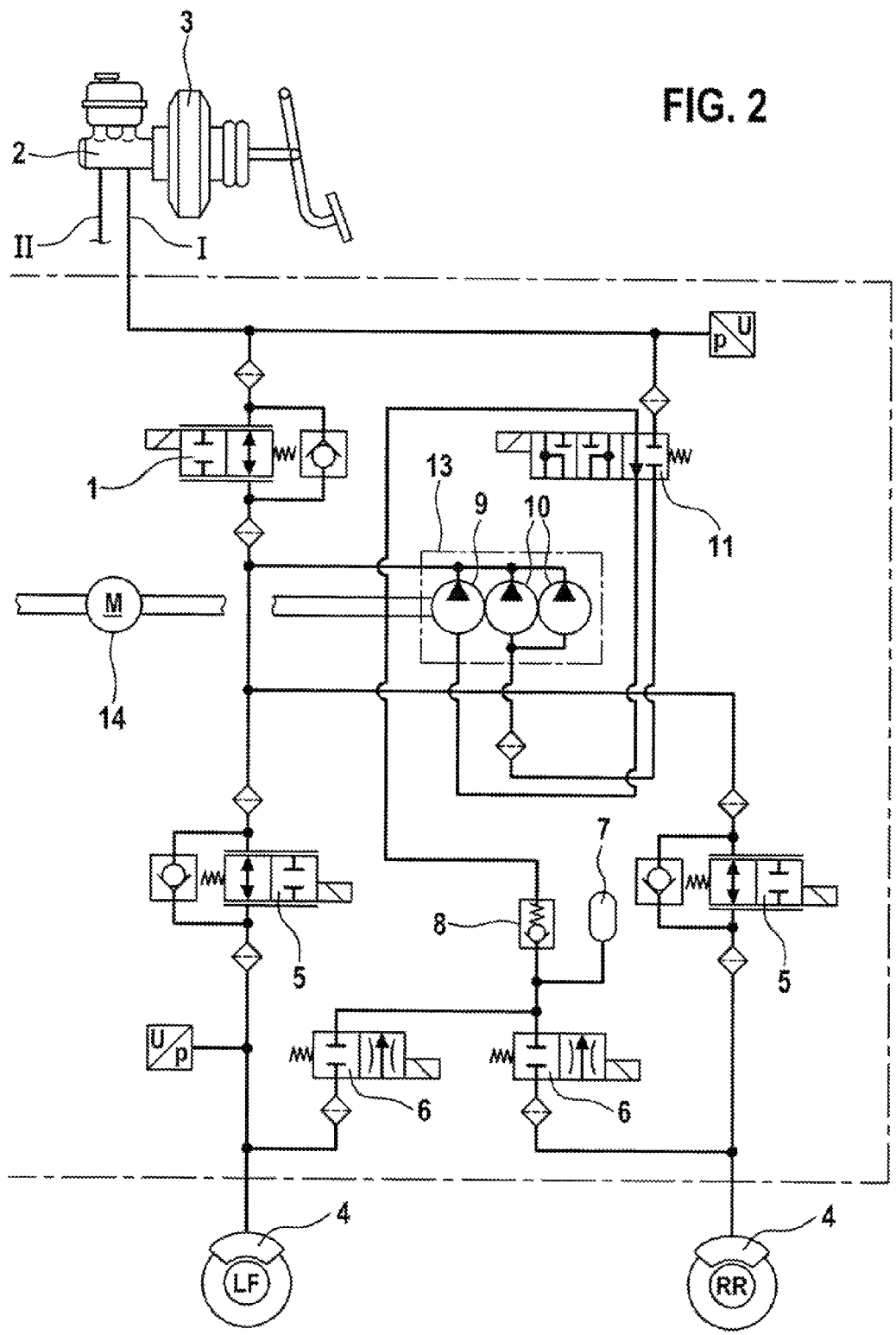
FIG. 2 shows a hydraulic circuit diagram of another embodiment of a slip-controlled vehicle brake system according to the disclosure.

In comparison with FIG. 1, FIG. 2 lacks the check valve 12 on the suction sides of the two further hydraulic pumps 10, and therefore the two further hydraulic pumps 10, the suction sides of which are connected to one another, are separated hydraulically from the first hydraulic pump 9, at least on the suction sides. In FIG. 2, the intake valve 11 is a 4/3-way solenoid valve, which, in its deenergized normal position, connects the suction side of the first hydraulic pump 9 to the check valve 8, which is connected to the pressure lowering valves 6 of the wheel brakes 4, and separates the suction sides of the two further hydraulic pumps 10 from the brake master cylinder 2. In one operating position, the intake valve 11 connects the suction sides of all three hydraulic pumps 9, 10 to the brake master cylinder 2 and, in another operating position, the intake valve 11 connects the suction sides of all three hydraulic pumps 9, 10 to the check valve 8, which is connected to the pressure lowering valves 6 of the wheel brakes 4. The other operating position of the intake valve 11, which connects the suction sides of all three hydraulic pumps 9, 10 to the check valve 8, is not absolutely necessary. In the normal position of the intake valve 11, the two further hydraulic pumps 10 run along "at idle", as already described in relation to FIG. 1, and only the first hydraulic pump 9 delivers, as a result of which brake fluid can be delivered in the vehicle brake system, even at very high brake pressure. In the operating position or positions of the intake valve 11, all three hydraulic pumps 9, 10 deliver, thereby allowing a very rapid brake pressure buildup. Like the other solenoid valves 1, 5, 6, the intake valve 11 is a switchable valve, which can also be referred to in general as a switching valve. In contrast, the check valves 8, 12 are not switchable but switch or control a through flow direction automatically.

What is claimed is:

1. A slip-controlled hydraulic vehicle brake system, comprising:
    a brake master cylinder; and
    a brake circuit comprising:
        a first hydraulic pump including a first suction side hydraulically connected to a wheel brake via a pressure lowering valve; and
        a second hydraulic pump including a second suction side hydraulically connected to the brake master cylinder via an intake valve,
    wherein the first suction side of the first hydraulic pump and the second suction side of the second hydraulic pump are separated hydraulically from one another, and
    wherein a first pressure side of the first hydraulic pump and a second pressure side of the second hydraulic pump both discharge into a common hydraulic line.

2. The slip-controlled hydraulic vehicle brake system according to claim 1, the brake circuit further comprising a third hydraulic pump having a third suction side hydraulically connected to the second suction side of the second hydraulic pump.

3. The slip-controlled hydraulic vehicle brake system according to claim 1, the brake circuit further comprising a switching valve hydraulically connected between the pressure lowering valve and the first suction side of the first hydraulic pump.

4. The slip-controlled hydraulic vehicle brake system according to claim 3, wherein the intake valve and the switching valve are combined to form one valve.

5. The slip-controlled hydraulic vehicle brake system according to claim 1, wherein the first and second suction sides are configured to be connected to one another by at least one of the intake valve, a switching valve, and a check valve.

6. The slip-controlled hydraulic vehicle brake system according to claim 1, wherein at least one of the first and second suction sides is configured to be hydraulically connected to at least one of the brake master cylinder and the pressure lowering valve by the intake valve.

7. The slip-controlled hydraulic vehicle brake system according to claim 1, further comprising a common drive motor configured to drive both the first and second hydraulic pumps.

8. The slip-controlled hydraulic vehicle brake system according to claim 1, the brake circuit further comprising a pressure buildup valve hydraulically connected between (i) the wheel brake and the brake master cylinder and (ii) the wheel brake and the common hydraulic line.

9. The slip-controlled hydraulic vehicle brake system according to claim 1, wherein the brake circuit is hydraulically connected between the brake master cylinder and the wheel brake.

10. A slip-controlled hydraulic vehicle brake system, comprising:
    a brake master cylinder; and
    a brake circuit comprising:
        a first hydraulic pump including a first suction side hydraulically connected to a wheel brake via a pressure lowering valve; and
        a second hydraulic pump including a second suction side hydraulically connected to the brake master cylinder via an intake valve,
    wherein the first suction side of the first hydraulic pump and the second suction side of the second hydraulic pump are separated hydraulically from one another when the intake valve is in a closed position, and
    wherein a first pressure side of the first hydraulic pump and a second pressure side of the second hydraulic pump both discharge into a common hydraulic line.

11. The slip-controlled hydraulic vehicle brake system of claim 10, the brake circuit further comprising:
    a first hydraulic line hydraulically connecting the intake valve and the first suction side;
    a second hydraulic line hydraulically connecting the intake valve and the second suction side,
    wherein the intake valve is configured such that in the closed position the first and second hydraulic lines are hydraulically separated from one another, and in a first open position the first and second hydraulic lines are hydraulically connected to one another.

12. The slip-controlled hydraulic vehicle brake system of claim 11, wherein the intake valve is configured such that, in the first open position, the intake valve hydraulically connects the first and second hydraulic lines with the brake master cylinder.

13. The slip-controlled hydraulic vehicle brake system of claim 12, wherein the intake valve has a second open position configured such that the first and second hydraulic lines are hydraulically connected to the pressure lowering valve.

14. The slip-controlled hydraulic vehicle brake system of claim 10, wherein the intake valve is configured such that, in the closed position, the first hydraulic line is hydraulically connected to the pressure lowering valve.

15. The slip-controlled hydraulic vehicle brake system according to claim 10, the brake circuit further comprising a switching valve hydraulically connected between the pressure lowering valve and the first suction side of the first hydraulic pump.

16. The slip-controlled hydraulic vehicle brake system according to claim 10, the brake circuit further comprising a pressure buildup valve hydraulically connected between (i) the wheel brake and the brake master cylinder and (ii) the wheel brake and the common hydraulic line.

17. The slip-controlled hydraulic vehicle brake system according to claim 10, wherein the brake circuit is hydraulically connected between the brake master cylinder and the wheel brake.

* * * * *